United States Patent Office 3,741,749
Patented June 26, 1973

3,741,749
METHOD FOR THE PREPARATION OF CHARGED CADMIUM-NICKEL POWDER AND BATTERY ELECTRODE POWDER MADE THEREBY
Bonnie K. Jochmann, Pittsburgh, Pa., and Torbjorn Nervik, Selbu, Norway, assignors to ESB Incorporated
No Drawing. Filed Sept. 3, 1971, Ser. No. 177,839
Int. Cl. C22c 17/00
U.S. Cl. 75—.5 A           9 Claims

ABSTRACT OF THE DISCLOSURE

A metallic powder comprising cadmium, nickel and a cadmium nickel intermetallic compound is prepared by reacting in an aqueous acidic solution cadmium and nickel salts with a metal less noble than cadmium and nickel. The powder so produced has high surface area, high electrical activity and is easily fabricated into battery plates.

BACKGROUND OF THE INVENTION

(1) Field of the invention

This invention relates to the manufacture of active materials for battery electrodes. In particular, it describes a metallic powder for use in battery negative plates and its use as a battery electrode.

(2) Description of the prior art

The chemical displacement of a noble metal by a less noble metal was one of the early observations in the history of chemistry. The reaction, in which a base metal (such as aluminum or zinc) is placed in a solution of a more noble metal salt (such as cadmium or nickel chloride) results in the precipitation of the more noble metal (such as nickel or cadmium) often in a particulate or spongy metallic form. The salt of the base metal (such as zinc or aluminum chloride) remains in the solution. This rather primitive type of reaction does not find much use in industry today as there are normally less costly ways to produce the end result. However, when dealing with comparatively small quantities of materials and also when dealing with battery electrodes where a particular and sometimes a somewhat undefinable end product is desired, a more costly preparation giving the desired product may be better than a less costly preparation that does not give as good an end product. In the case of the present invention, this displacement type of reaction is used.

Cadmium sponge electrodes have been used in secondary nickel cadmium storage batteries since early in the present century. In one usual cell construction, cadmium oxide or cadmium hydroxide often containing some nickel hydroxide, is folded into a perforated steel pocket. In other mixes, iron oxide is also included. Several strips of this pocket are fastened together to form a battery plate. One or more such plates along with similar plates filled with nickel hydroxide are assembled into a cell. The cell so formed is filled with electrolyte, usually potassium hydroxide, and given an electrochemical treatment known as formation in which the cells are charged and discharged several times. In this treatment, the cadmium is converted to metallic cadmium sponge. Because of certain technical peculiarities of the nickel cadmium battery system, it has not been customary to prepare these batteries in the "dry charged" or "pre-formed" condition. It is usual to ship the batteries filled with electrolyte and ready to use. Until recently, there has not been a demand for battery grade metallic cadmium sponge. The classical electrolytic forming process, although quite suitable for large cells built on a custom basis, is not suitable for use in small or miniature cells built on a mass production basis. For mass production, it is more convenient to use an active metallic sponge powder which can be metered out and fed by automatic machinery. By the use of an active or charged active material, the cells can be sealed up and completed without requiring the four or more days of formation needed in the classical large cell production method.

It has been proposed to make a special type of active cadmium electrode material by reacting certain cadmium compounds with aluminum powder in a basic solution. This process is stated to provide a metallic sponge made up of two forms of cadmium metal crystal, one plate-like and one acicular. The plate-like crystals in particular appear to be dense and of somewhat geometrical shapes.

However, even as late as the spring of 1970, it was stated by a battery authority at an open technical meeting that "cadmium powders are no good and give less than 5% efficiency at any temperature." (Mr. Carson, "Low Temperature Mercury-Cadmium Batteries," Signal Corps Power Sources Conference, May 1970 Bound Proceedings available fall 1970.)

SUMMARY OF THE INVENTION

In this invention, cadmium powder containing co-precipitated nickel is prepared by reacting cadmium and nickel ions with metallic aluminum powder in an acid salt solution. The metallic sponge precipitate so formed is washed and dried by means preserving its metallic state. The product may be pressed into pellets or otherwise fabricated to become an active negative electrode suitable for use in primary or charged secondary electrochemical cells. A secondary product of the precipitation reaction is an intermetallic compound identified as $Cd_4Ni$. This material is believed to have beneficial properties when included in a battery electrode.

From this summary, it is seen that the process of the invention differs from other non-electrolytic processes used to prepare metallic cadmium powder for battery use in that the so-prepared powder contains a portion of reduced nickel, that the process is conducted in an acidic solution, or solution of low pH, that as a result some or all of the nickel in the finished mass is in the form of a nickel-cadmium intermetallic compound and that the product is in a powder form. The presence of the intermetallic compound is beneficial in making the resultant powder hard and resistant to distortion when pressed or pelletized. It also improves capacity and capacity retention of electrodes made therefrom. The method of preparation further produces an active powder of extreme electrochemical activity.

DESCRIPTION OF THE PREFERRED EMBODIMENT

A solution of a soluble cadmium salt such as chloride, nitrate, sulfate or acetate or other such salt along with a quantity of a nickel salt is prepared. The ratio of nickel to cadmium may be as high as 1:1 (50%) by weight (on a metallic basis) or it may be as low as 1:1000 (0.1%). The preferable range is from approximately 0.1% to approximately 10% nickel. The solutions are naturally acidic having pH's in the range of 5 to 6. However, it is desirable to adjust the acidity to approximately pH 5.5 or lower by the addition of small amounts of acid such as the acid of the cadmium salt. The exact concentration of the solution is not critical except that for reproduceability of end product, a desired concentration should be chosen and adhered to. Weak solutions require excess water and give handling problems associated with large volumes whereas concentrated solutions are more difficult to dissolve and filter. A suitable range is from 200 to 500 gms. per liter of cadmium chloride plus the desired quantity of nickel chloride.

To this is added a finely divided metal powder. The metal powder must be less noble electrochemically (i.e., higher on the EMF series) than the nickel and zinc. Although the list of less noble metals includes lithium, rubidium, potassium, strontium, barium, calcium, sodium, magnesium, aluminum, beryllium, uranium, manganese, tellurium, zinc, chromium, gallium and iron, for economic as well as technical reasons aluminum, magnesium, calcium, manganese and zinc have been found to be the most suitable of the latter, and because of availability, aluminum and zinc are recommended in practice.

In theory, the amount of metal powder added should be in stoichiometric ratio to the quantity of cadmium and nickel in the reaction vessel. In practice, however, it is found desirable to add a slight excess of the metal powder. With aluminum, up to 15% excess over the theoretical has given best results whereas with zinc, an excess of up to 5% has proven to be sufficient.

If too much metal powder is used, unreacted metal will appear in the end product. If too little, valuable cadmium and nickel may be wasted. For cadmium, the stoichiometric ratio is 16.1 parts of aluminum to 100 parts of elemental cadmium and for nickel. 17.4 gms. aluminum to 100 gms. nickel (elemental). The values for zinc are 58 gms. Zn to 100 g. cadmium and 111 gms. Zn to 100 gms. nickel.

The mixture is allowed to react at a temperature of from about 20 to about 80° C. for a non-critical period of time with slight agitation. In the laboratory, with a given batch size, reaction times of 5 minutes to 24 hours have been used with success.

When the reaction is complete, the acidity of the solution will have changed somewhat. With aluminum as precipitant the final acidity is a pH of about 1 whereas with zinc, it ends up at around pH 5. It is necessary that the solution is maintained acidic at all times to prevent precipitation as hydroxide of the reacting metal. The solution is then drawn off leaving a particulate spongy material. This is washed by any suitable means until the product is free from soluble ions. It is then dried. The clean dried powder material so formed easily joins itself under pressure to form a porous matrix.

If the powder is dried in air, there is the possibility that some or all of it may become oxidized. This defeats the purpose of the preparation. Therefore, it is advisable to conduct the drying operation in an oxygen starved atmosphere. Vacuum drying or inert gas drying can be used to advantage. However, if the damp material is quickly dried by a blast of dry air at or near room temperature so that it does not heat up, a satisfactory product can also be produced.

Binding or expanding agents such as rubber latex or polyvinyl pyrrolidone can be added to the finished metal powder.

It is found that the metallic powder formed by this method consists of irregular-shaped particles or conglomerations of particles of high surface area. A negligible proportion of acicular shaped particles result from this process. It is believed that high surface area and the absence of acicular particles is due to the displacement of cadmium from an acid solution. Microscopic examination of individual particles show irregular agglomerates of 0.1 micron to 10 microns in the largest dimension.

Surface area determinations (by the B.E.T. or other similar procedure) of the preferred product indicate a specific surface area of about .4 to about .75 square meters per gram of unpressed material.

X-ray analysis of material prepared by the method of the invention shows clear evidence of an intermetallic compound along with a preponderance of metallic cadmium. This cadmium-nickel intermetallic compound is listed in the ASTM X-ray powder diffraction file and has a cubic structure with a unit cell dimension of $a_0=9.781$ A. (angstrom units) and has tentatively been given the structure of $Cd_4Ni$.

Although this material ($Cd_4Ni$) has been reported by others, to the best knowledge of the inventor, it is believed that the means used by others to prepare it did not result in an active cadmium-nickel powder suitable for battery electrode manufacture.

A beneficial effect of this intermetallic material is that it is harder than cadmium. When the powder material containing the cadmium-nickel complex is pressed into a pellet, the complex resists compression, giving a strong, highly porous matrix having a low electrical resistance, which features are desirable in a battery electrode.

EXAMPLE I

To a solution of:

| | Gr. |
|---|---|
| $CdCl_2 \cdot 2.3H_2O$ | 400 |
| $NiCl_2 \cdot 6H_2O$ | 100 |
| Water | 1000 | was added 37.9 gms. of aluminum powder. There was a vigorous reaction which ceased after about 10 minutes. The sponge produced was washed with water and acetone and dried in a vacuum.

Electrodes .85 inch in diameter were prepared from this powder. They were pressed at various compaction pressures and then tested as electrodes in 30% potassium hydroxide solution. The results of the testing were:

| Pellet weight (grams) | Pressure (lbs.) | Density, g./in.³ | Capacity (ma.h.)[1] Measured | Capacity (ma.h.)[1] Theoretical | Ampere hour efficiency (percent) |
|---|---|---|---|---|---|
| 2.8 | 600 | 37.6 | 838 | 1,049 | 79.8 |
|  | 800 | 42.0 | 845 | 1,049 | 80.3 |
| 3.0 | 600 | 38.3 | 923 | 1,125 | 81.9 |
|  | 800 | 42.6 | 938 | 1,125 | 83.3 |
| 3.3 | 1,000 | 42.8 | 1,075 | 1,240 | 86.7 |
|  | 2,000 | 51.4 | 1,075 | 1,240 | 86.7 |

[1] Discharged at 25 milliampere rate in excess 30% potassium hydroxide solution to give an ampere hour capacity in milliampere hours.

EXAMPLE II

To a solution of:

| | Gr. |
|---|---|
| $CdCl_2 \cdot 2.5H_2O$ | 99.5 |
| $NiCl_2 \cdot 6H_2O$ | 4.0 |
| $H_2O$ | 215 |

Total volume 250 ml.

was added 9.37 gr. Al powder over a period of 15 min. It was then agitated for one additional 30 minutes. The metallic residue was washed with water and then by acetone. It was then dried under vacuum at 50° C.

Product: 46.0 gr. Cd·Ni (98% Cd, 2% Ni), 92% recovery yield (Cd).

From this powder a circular pellet was formed. The pellet was discharged in excess 31% KOH on a 100 ohm continuous load at 70° F. against a mercuric oxide antipode. The following results were obtained:

| Endpoint, volt | .8 | .7 | .6 |
|---|---|---|---|
| Capacity, ma. h | 1,039 | 1,264 | 1,322 |
| Efficiency, percent of theoretical | 79.6 | 96.6 | 101 |

EXAMPLE III

Effect of percent coprecipitated nickel using aluminum

Cadmium coprecipitated with various amounts of nickel was discharged at the 20 ma. rate in excess 30% potassium hydroxide as follows:

| Percent nickel | Capacity (ma.h.) | Theoretical capacity | Efficiency, percent |
|---|---|---|---|
| 10 | 1,090 | 1,330 | 82 |
| 5 | 1,220 | 1,472 | 83 |
| 2 | 1,308 | 1,518 | 86 |
| ¼ | 1,050 | 1,546 | 68 |
| 0 | 476 | 1,360 | 35 |

The cadmium precipitated without nickel was very soft and difficult to form into electrode pellets. In this series 2% nickel gave optimum results.

EXAMPLE IV

Effect of the amount of aluminum

To the same solution as in Example II was added: 8.57 gr. (105%), 8.98 gr. (110%), 9.37 gr. (115%), 9.79 gr. (120%) Al powder over a period of 30 min. The reaction was allowed to complete by another 15 min. with good stirring. Washing, drying, pelleting and discharge was done as in Example II.

The following results were obtained:

| Percent Al added: | Percent recovery yield (Cd) |
|---|---|
| 105 | 85 |
| 110 | 89 |
| 115 | 94 |
| 120 * | 99 |

*Some batches with 120% Al addition have gassed in KOH because of excess metallic Al present in the coppt. CdNi powder.

EXAMPLE V

Typical procedure using zinc

To a solution of:

|  | Gr. |
|---|---|
| $CdCl_2 \cdot 2.5H_2$ | 100.0 |
| $NiCl_2 \cdot 6H_2O$ | 3.0 |
| $H_2O$ | 215 | was added: 30.1 gr. (102%) Zn powder.
Total volume, 250 ml.

The reaction was allowed to continue for 20 min. with good stirring. The metallic residue was washed with HCl, water and acetone and dried under vacuum at 50° C. Product: 49.0 gr. Cd·Ni (98.5% Cd, 1.5% Ni) (recovery yield—98% Cd). Pelleting and discharge was done as in Example II. Results (Theor. capacity—1331 ma. h., based on percent Cd metal found by analysis)

| Endpoint, volt | .8 | .7 | .6 |
|---|---|---|---|
| Capacity, ma. h | 1,090 | 1,244 | 1,253 |
| Efficiency, percent of theoretical | 81.8 | 93.5 | 94.2 |

Efficient washing with $NH_4OH$ instead of HCl can successfully be applied.

EXAMPLE VI.—EFFECT OF COPRECIPITATED METAL ON CAPACITY RETENTION

| Percent coprecipitated Ni | 0 | .4 | 2.0 |
|---|---|---|---|
| Initial capacity (AH) | .965 | 1.091 | 1.282 |
| Percent nickel powder added | 10 | 0 | 0 |

| | Percent initial capacity | | |
|---|---|---|---|
| Weeks stand at 200° F. in excess of 30% KOH: | | | |
| 0 | 100 | 100 | 100 |
| 1 | 85 | 73 | 94.7 |
| 2 | 71.1 | 60.5 | 85.9 |
| 3 | 47.5 | 48.4 | 73.7 |

NOTE.—The quantity of intermetallic nickel-cadmium is believed to be approximately proportional to the percent of coprecipitated nickel.

Remarks on the examples

Example I shows the effect of compaction pressure on the efficiency of powder material made in accordance with the invention.

Example II shows the extremely high ampere hour efficiency obtainable by the method of the invention. For comparison other preparations yield 65 to 75% ampere hour efficiencies.

Example III shows the poor performance of the material when nickel is omitted from the mixture.

Example IV shows the increased yield with increased aluminum addition. However, as indicated, an excessive amount of aluminum caused the material to gas.

Example V is a typical preparation using zinc as the reactant.

Although the examples chosen relate to button electrodes, metallic powder made by the process of the invention can be used in other battery plate configurations such as:

(a) the powder material may be used to fill pockets from which pocket-type plates are made; or
(b) the powder material may be distributed about a screen or other perforate grid structure and attached thereto by pressure welds, i.e. by the application of pressure to the powder after distribution about the grid structure.

Having fully described our invention and given several examples of its embodiment, we hereby claim:

1. A metallic powder for use in the manufacture of cadmium electrodes which is comprised of a major portion of metallic cadmium, a minor portion of metallic nickel, and at least a part of the cadmium and a part of the nickel in the form of an intermetallic compound.

2. A metallic powder as defined in claim 1 in which the surface area thereof is within the limits of about .4 and about .75 square meter per gram.

3. A metallic powder as defined in claim 1 in which the intermetallic compound has a cubic structure with a unit cell dimension of about 9.781 angstrom units.

4. A metallic powder as defined in claim 1 in which the portion of nickel in the powder is within the limits of 0.1% and 10% and the remaining portion comprises cadmium.

5. A method for the preparation of cadmium-nickel powder which comprises:
   (a) preparing an acid aqueous solution of cadmium and nickel salts;
   (b) adding to the aqueous solution a metallic powder less noble electrochemically than nickel and cadmium, thereby precipitating a cadmium-nickel powder material;
   (c) washing the precipitated nickel cadmium powder material; and
   (d) drying the washed powder.

6. A method as defined in claim 5 in which the cadmium and nickel salts are selected from the group consisting of chlorides, sulfates, nitrates and acetates.

7. A method as defined in claim 5 in which the ratio of nickel to cadmium in the salt solution is between approximately 1 part of nickel to 1000 parts of cadmium and 1 part of nickel to 1 part of cadmium.

8. A method as defined in claim 5 in which the less noble metal powder is chosen from the group consisting of aluminum, zinc, magnesium and calcium.

9. A method as defined in claim 5 in which the acidity of the aqueous solution is within the range of about pH 1 to about pH 6.

References Cited

UNITED STATES PATENTS

| 2,011,739 | 8/1935 | Teats | 75—109 |
| 2,473,962 | 6/1949 | McCutcheon | 75—109 |
| 3,297,433 | 1/1967 | Stark | 75—0.5 A |

WAYLAND W. STALLARD, Primary Examiner

U.S. Cl. X.R.

75—109, 151